United States Patent [19]
Burgess et al.

[11] Patent Number: 5,135,031
[45] Date of Patent: Aug. 4, 1992

[54] POWER TRANSMISSION

[75] Inventors: Roy T. Burgess, Troy; Rajamouli Gunda, Rochester Hills; Frank Herta, Kewadin; Robert C. Hodges; James A. Kessler, both of Troy; Richard S. Leemhuis, Rochester Hills; Michael R. McCarty, Troy; Robert W. Stephens, Northville, all of Mich.

[73] Assignee: Vickers, Incorporated, Troy, Mich.

[21] Appl. No.: 769,112

[22] Filed: Sep. 30, 1991

Related U.S. Application Data

[62] Division of Ser. No. 412,211, Sep. 25, 1989, Pat. No. 5,073,091.

[51] Int. Cl.⁵ .......................................... F15B 13/044
[52] U.S. Cl. ................... 137/625.65; 60/443; 91/361; 251/129.05
[58] Field of Search ............... 60/443; 91/361; 137/625.65; 251/129.05

[56] References Cited

U.S. PATENT DOCUMENTS 4,757,747  7/1988  Blatter et al. ............... 91/362

*Primary Examiner*—Gerald A. Michalsky
*Attorney, Agent, or Firm*—Barnes, Kisselle, Raisch, Choate, Whittemore & Hulbert

[57] ABSTRACT

A rotary hydraulic machine which includes a housing having a shaft mounted for rotation within the housing about a shaft axis. A cylinder block is coupled to the shaft for co-rotation with the shaft within the housing and includes a plurality of cylinders disposed in a circumferential array parallel to and surrounding the shaft axis. A piston is disposed to reciprocate within each of the cylinders and is coupled to a yoke for determining displacement of the pistons within the cylinders. A valve plate is mounted on a valve block and includes kidney-shaped slots for registering with the cylinders as the cylinder block rotates, and thereby connecting the cylinders to pump input and output ports. A microprocessor-based controller is externally mounted on the pump valve block and includes internal memory having various remotely-selectable control programs prestored therein. Sensors responsive to pump operating conditions are connected to the pump control electronics, and include a first sensor responsive to yoke position, a pressure sensor responsive to pump output pressure and a speed sensor responsive to angular velocity of shaft rotation. All of the electronic components are mounted on the valve block.

6 Claims, 18 Drawing Sheets

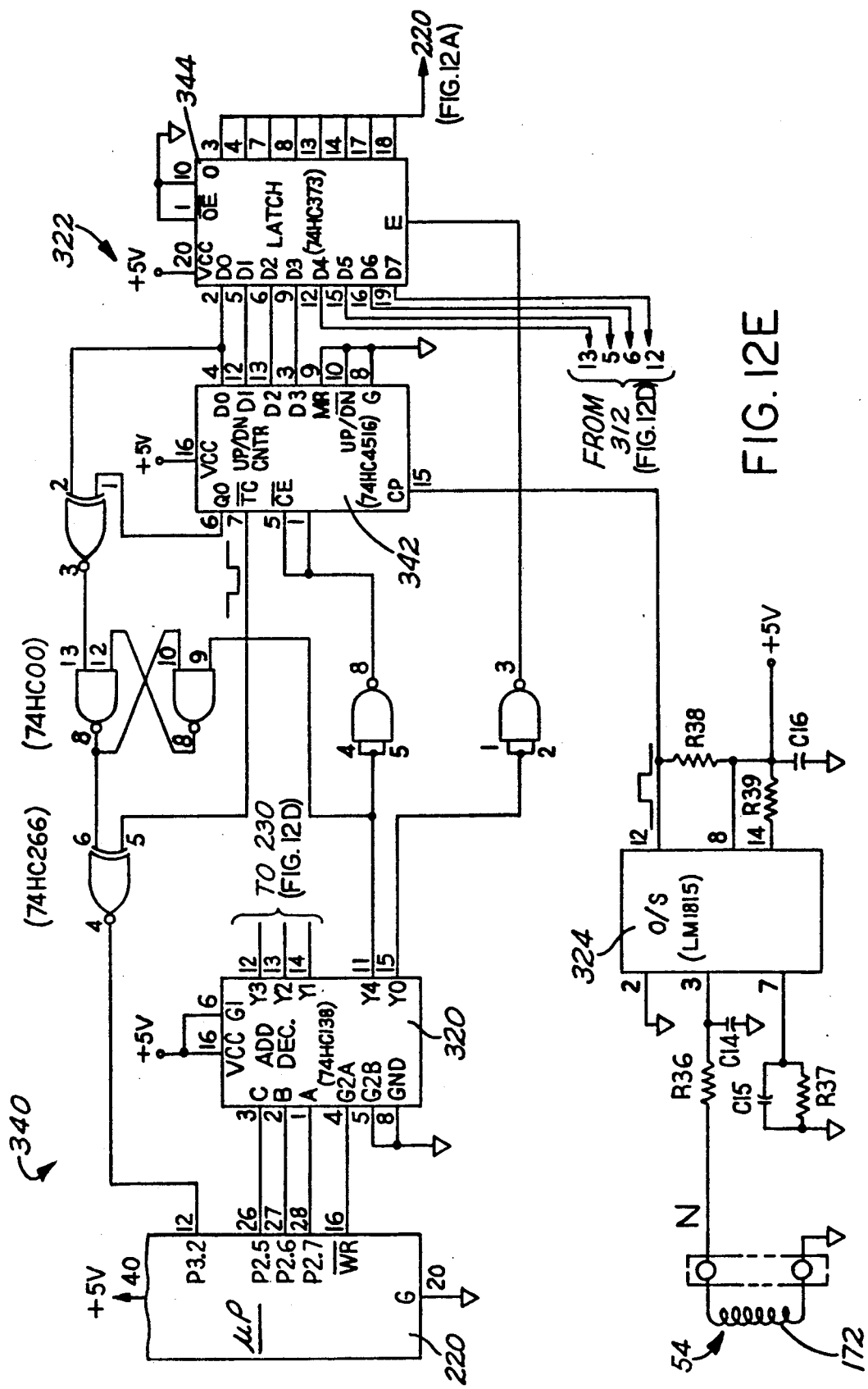

POWER TRANSMISSION

This is a divisional of copending application Ser. No. 07/412,211 filed on Sept. 25, 1989, now U.S. Pat. No. 5,073,091.

The present invention is directed to rotary hydraulic machines, and more particularly to electrohydraulic control of variable displacement hydraulic pumps and motors.

For purposes of convenience, the invention will be described in conjunction with a presently preferred implementation thereof embodied in an in-line variable displacement piston pump. It will be understood, however, that the principles of the invention apply equally as well to so-called bent-axis piston pumps, to variable displacement rotary pumps (e.g., gear and vane pumps), and to hydraulic motors of analogous structure.

BACKGROUND AND OBJECTS OF THE INVENTION

In electrohydraulic systems that include a plurality of electrohydraulic devices, such as servo actuators, motors and pumps, it is conventional practice to couple all of such devices to a remote master controller for coordinating or orchestrating device operation to perform a desired task. Motors and actuators may be employed, for example, at several coordinated stages of a machine tool line for automated transfer and machining of parts at a series of work stations. In accordance with conventional practice, the master controller may comprise a programmable controller or the like coupled through individual digital-to-analog converters to the various remotely-positioned electrohydraulic devices for supplying control signals thereto. For closed-loop operation, a sensor is positioned at each electrohydraulic device for sensing operation thereof, and feeding a corresponding signal to the master controller through an analog-to-digital converter.

Thus, in a system that embodies a plurality of electrohydraulic devices, a substantial quantity of electrical conductors must be provided for feeding individual control signals to the various devices and returning sensor signals to the master controller. Such conductors interfere with system design and operation, and are subject to failure. The bank of d/a and a/d converters for feeding signals from and to the master controller add to the expense and complexity of the overall system. Perhaps most importantly, system performance is limited by capabilities of the master controller. For example, a programmable controller may require one hundred milliseconds to scan a device sensor signal, compute a new control signal and transmit such control signal to the remote device. Such overburdened programmable controller operations are not acceptable in high performance applications that may require a six millisecond response time, for example, at each of a plurality of remote devices.

It is therefore a general object of the present invention to provide an electrohydraulic servo system that exhibits the fast response time necessary for high performance applications, while at the same time reducing cost and complexity that inhere in prior art system of the character described above. In furtherance of the foregoing, a more specific object of the invention is to provide a system of the described character wherein each of the system electrohydraulic devices embodies microprocessor-based control adapted to communicate with a central or master controller and for thereby distributing control of the several electrohydraulic devices while maintaining overall coordination thereamong.

Conventional in-line variable displacement pumps comprise a case or housing within which a cylinder block is coupled to a rotatable drive shaft. The cylinder block contains a plurality of cylinder cavities disposed in a circumferential array around the shaft axis. A corresponding plurality of pistons are slidably positioned within the respective cylinders. The pistons engage a yoke cam that is variably positionable within the pump housing for collectively adjusting stroke or displacement of the pistons within the cylinders. The cylinder block rotates against a valve plate having arcuate inlet and outlet kidney-shaped slots that serve in a well-known manner to provide properly phased or timed communication between the end ports of the cylinder bores within which the pistons reciprocate, and inlet and outlet passages and ports in the pump housing. The yoke is variably positionable by an actuator piston that is hydraulically coupled to a control valve mounted on the pump adapter or valve block.

In electronically controlled pumps, the control valve comprises a solenoid valve that is connected to separate control electronics for variably controlling flow of hydraulic fluid through the solenoid valve, and thereby controlling position of the actuator piston and yoke. U.S. Pat. No. 4,823,552 discloses a variable displacement hydraulic pump and a control system in which a plurality of sensors responsive to operating conditions at the pump, such as pump speed, output pressure, output flow, yoke displacement and pump temperature, are connected to an electronic pump controller. The controller, which preferably comprises microprocessor-based control electronics, receives pump command signals from a remote master controller, compares the command signals with sensor feedback indicative of pump operating conditions, and controls pump displacement through a solenoid valve as a function of a difference or error therebetween. Conventionally, the sensors and controllers are provided as components separate from the pump itself, and must be assembled and interconnected (as previously described) at the installation site. The complexity of installation often delays start-up and limits applications.

In microprocessor-based control of hydraulic pump or motor speed, such as that in the U.S. application noted in the preceding paragraph, one method of sensing unit speed is to measure the time interval between adjacent teeth of a toothed wheel or sprocket affixed to the shaft. Typically, this is accomplished through use of an electromagnetic pickup and feeding the cyclic electronic signal through appropriate conditioning circuitry to the control microprocessor. Each tooth passing the pickup causes the microprocessor to interrupt its computations and other control programming to store and then reset the value of the pickup internal timer. A number of limitations and problems are encountered in use of this technique for measuring the speed of the pump or motor. For example, at high speeds, resolution is limited due to the short time interval between adjacent teeth, necessitating that the interval be averaged over a substantial number of tooth intervals. Furthermore, long and/or frequent interrupt service routines are undesirable in such applications because they delay the servicing of other interrupts and normal control processing. This can result in loss of data, noise on the pulse width modulated valve control signal, and other problems. Moreover, the variable time delay caused by servicing other interrupts can result in errors in measuring the interval between detected teeth.

U.S. Pat. Nos. 4,744,218 and 4,811,561 disclose electrohydraulic servo systems in which a plurality of electrohydraulic devices, including a variable displacement pump and associated microprocessor-based controller, are connected in common by a serial communication bus to a remote master controller. The pump controller includes address switches for selecting an appropriate address for communications with the master controller, and memory in which a plurality of control programs are stored for remote selection by the master controller. U.S. Pat. No. 4,757,747 discloses an electrohydraulic system that includes a plurality of electrohydraulic devices, specifically a plurality of actuator-controlling servo valves, individually controlled by on-board microprocessor-based control electronics. Each individual device controller is connected to and addressable by a master controller for coordinating operation of the various devices.

A general object of the present invention is to provide an improved rotary electrohydraulic machine, particularly a variable displacement hydraulic pump, in which all control components, including pump condition sensors and microprocessor-based control electronics, are fully integrated into a single compact inexpensive package, and which may be readily employed in a wide variety of system applications. Another object of the invention is to provide a rotary electrohydraulic machine of the described character with enhanced commonality of hardware, including particularly control sensors, electronics and wiring, among machines of varying size and rating.

A further object of the invention is to provide a system for controlling operation of a rotary hydraulic machine, such as a pump or motor, in which machine speed is monitored by state-of-the-art microprocessor-based control with reduced interrupt service problems, and with enhanced measurement accuracy and resolution.

Yet another object of the present invention is to provide a system for controlling an electrohydraulic valve, such as the displacement-control valve of a variable displacement pump, with valve drive electronics that exhibit reduced heat dissipation as compared with prior art devices of a similar character, and that have enhanced capabilities for protecting the drive circuitry against damage due to failure at the valve solenoid.

SUMMARY OF THE INVENTION

In accordance with the present invention, a variable displacement rotary hydraulic machine includes a housing having a shaft mounted therewithin for rotation about a shaft axis. A cylinder block having at least one cylinder cavity is mounted within the housing and a piston is disposed in the cylinder cavity, with the piston on the cylinder block being coupled to the shaft to obtain cyclic motion of the piston within the cavity. In the disclosed variable displacement pump, the cylinder block is coupled to the drive shaft, and a plurality of pistons slidably engage a yoke which is variably positionable about an axis transverse to the shaft drive axis for varying stroke and displacement of the pistons within the cylinder bores. A valve block selectively connects the cylinder cavity with fluid inlet and outlet ports as a function of angular position of the cylinder block about the shaft axis. Microprocessor-based control electronics is mounted on the valve block and include facility for receiving and storing electronic control signals from an external source. (In some high temperature applications, it may be desirable to position the control electronics remotely of the pump body.) The control electronics is responsive to such control signals for selectively controlling position of the displacement-control yoke. Most preferably, the microprocessor-based control electronics take the form of one or more circuitboard assemblies mounted in stacked orientation externally of the valve block and enclosed by a removable cover.

Sensors are mounted on the valve block for sensing pump operating conditions and providing corresponding sensor signals to the pump control electronics. In the preferred variable displacement pump embodiment of the invention, such sensors include a yoke position sensor for providing a signal indicative of pump displacement, a pressure sensor coupled by fluid passages in the valve block to the pump output for providing a signal indicative of pump output pressure, and a speed sensor that includes a stator carried by the valve block and a rotor mounted to the pump drive shaft for providing a signal indicative of shaft rotation. The various sensors are connected to the pump control electronics by conductors that extend through sealed passages in the valve block. Thus, with the exception of the speed sensor rotor mounted on the pump drive shaft within the pump housing, all sensor and control electronics are carried by the valve block.

An electrohydraulic valve is removably externally mounted on the pump valve block, and has an input coupled to the pump output port and an output connected through passages in the valve block to a cylinder for controlling position of the yoke. A valve element coupled to a solenoid armature is movably positionable for controlling flow of fluid between the valve input and output ports. A valve solenoid stator receives signals from the control electronics as a function of a difference or error signal between displacement command and sensor signals, and as a supplemental function of the pressure and pump speed sensor signals.

A system for controlling operation of a rotary hydraulic machine in accordance with another aspect of the present invention includes microprocessor-based control circuitry responsive to electronic signal cycles indicative of machine speed for controlling an operating characteristic of the machine. In particular, the control circuitry includes a control microprocessor, an address decoder responsive to control signals from the microprocessor for initiating a speed-measurement cycle, and a counter for measuring time duration over a preselected number of the signal cycles, with the microprocessor being responsive to such time duration for determining speed of shaft rotation. The clock input of the counter is connected to receive the cyclic speed-indicative signals from an electromagnetic pickup or the like responsive to a toothed wheel coupled to the machine shaft. The counter enable input is coupled through the address decoder to the control microprocessor for enabling counter operation. The counter comprises a down-counter having data inputs for preloading a count corresponding to the preselected number of signal cycles over which the interval is to be measured. A latch has an input coupled to the control microprocessor for receiving and storing the cycle count, and the output of the latch is coupled to the counter data inputs. The address decoder is responsive to microprocessor control for selectively preloading the latched count into the counter data inputs.

An electrohydraulic valve control system in accordance with a further aspect of the invention includes a hydraulic valve having a stator coupled to an armature for controlling position of a movable valve element. The coil of the stator is connected to valve drive circuitry that includes a solid state switch, preferably an N-FET, that is connected between a voltage supply and one terminal of the valve coil, with the other terminal being connected to electrical ground. A control switch circuit receives a switch control signal from the microprocessor-based control electronics, and is connected to the control electrode of the N-FET for setting the switch circuit and applying power to the valve coil through the N-FET in response to the valve control signal. Feedback circuitry from the valve coil is responsive to current through the coil for resetting the switch circuit and interrupting application of power to the coil independently of the switch control signal. The current-responsive circuitry includes feedback circuitry responsive to voltage drop across the coil for maintaining the switch circuit in the set condition, and thereby responsive to a short circuit at the valve coil, manifested by absence of voltage drop across the coil, to reset the switch circuit and prevent overheat and damage to the N-FET. The current-responsive circuitry further includes facility for detecting excess current through the coil and resetting the switch circuit responsive thereto, again for preventing overheat and damage to the N-FET.

In accordance with a further aspect of the present invention, a reduced size hydromechanical pressure-limiting valve, which has particular utility for use in limiting the maximum pressure of a variable displacement pump, is embodied in a manifold having passages for receiving fluid at pump output pressure and passages for communicating hydraulically with the pump displacement control piston. A spool is movably positioned within the manifold and has lands for controlling flow to and from the control piston. A spring engages one end of the spool within the manifold and urges the spool to a position that allows control piston fluid to vent to tank when the output pressure is below the limit value. A piston is slidably disposed in the spool at the opposing end and engages an abutment positioned in the manifold. An axial passage in the spool, which opens to the piston end, receives fluid from the pump output passage and causes the spool lands to slidably reposition to permit fluid flow to the displacement control piston, if the outlet pressure exceeds the limit value. Since the effective area of spool responsive to pump output pressure is based on the small piston diameter rather than the larger spool diameter, as in conventional pressure limiters, the required size of the opposing spring as well as the overall size of the pressure-limiting valve is reduced.

BRIEF DESCRIPTION OF THE DRAWINGS

The invention, together with additional objects, features and advantages thereof, will be best understood from the following description, the appended claims and the accompanying drawings in which:

FIGS. 12A-12E together comprise a detailed electrical schematic diagram of the pump control electronics illustrated in block form in FIG. 11.

DETAILED DESCRIPTION OF PREFERRED EMBODIMENTS

Figure 1:
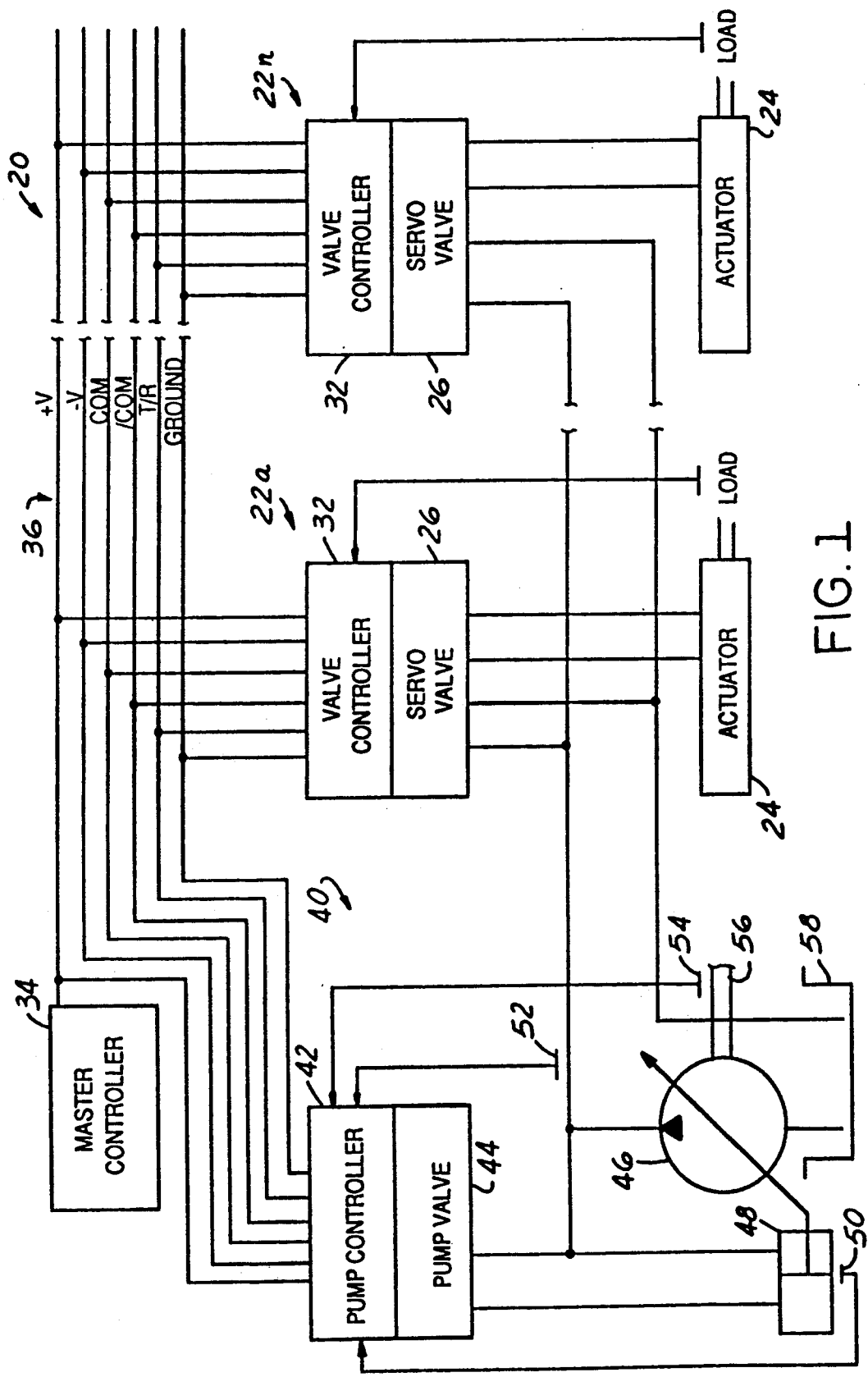
FIG. 1 is a functional block diagram of an electrohydraulic system that includes a variable displacement hydraulic pump in accordance with a presently preferred embodiment of the invention.

FIG. 1 illustrates an electrohydraulic system 20 in which a plurality of electrohydraulic devices 22a-22n each comprise a linear actuator 24 coupled to a corresponding load. Each actuator 24 is hydraulically controlled by an associated servo valve 26. Each servo valve 26 has associated therewith a microprocessor-based electronic valve controller 32 that receives a feedback signal indicative of motion at the associated actuator 24 and load. Valve controllers 32 are connected to a master controller 34 by a serial communication bus 36 that supplies electrical power to the valve controllers, transmits command and control information to the valve controllers, and receives and diagnoses status information returned therefrom. U.S. Pat. No. 4,757,747 noted above discloses servo valve 26 and microprocessor-based valve controller 32 combined in a unitary assembly for receiving and processing control information from master controller 34. U.S. Application Ser. No. 164,958, filed Mar. 7, 1988, now U.S. Pat. No. 4,811,561, and also referenced above, discloses an electrohydraulic system that features a serial communication bus 36. U.S. Pat. No. 4,745,744 discloses an exemplary master controller 34. The disclosures of such patents and applications, all assigned to the assignee hereof, are incorporated herein by reference for purposes of background information.

Also connected to control bus 36 is an electronically controlled variable displacement hydraulic pump system 40 in accordance with an exemplary implementation of the present invention. Pump system 40 includes a microprocessor-based pump controller 42 connected to bus 36 for receiving pump commands (and electrical power) from master controller 34, and for controlling output displacement of pump 46 through a pump control valve 44 and a yoke actuator 48. Pump controller 42 receives feedback signals from a first sensor 50 responsive to yoke position, a second sensor 52 responsive to pump output pressure, and a third sensor 54 responsive to speed of rotation of the pump drive shaft 56. Pump 46 is thus controlled to supply hydraulic fluid under pressure at its output port to servo valves 26, with fluid being returned from valves 26 to a fluid sump 58.

Pump system 40, in accordance with a presently preferred embodiment of the invention, comprises a unitary assembly illustrated in greater detail in FIGS. 2-8. A case 60 is mounted to one face of a valve block 62 and defines an internal pump cavity 64. A pump drive shaft 66 is mounted within cavity 64 by bearings 68 (FIG. 4) for rotation about its axis. A cylinder block 70 is coupled by the splines 72 for co-rotation with shaft 66 about the shaft axis. A plurality of cylinder bores 76 are disposed in cylinder block 70 in a circumferential array about the shaft axis of rotation and slidably receive a corresponding plurality of pistons 74. A shoe 78 is pivotally carried at the base of each piston 74 and is captured by a ring 80 for sliding engagement with the face 82 of a swash plate or yoke 84. Yoke 84 is mounted on a saddle bearing 86 carried by case 60 for movement about an axis perpendicular to the axis of shaft 66.

A valve plate 88 is mounted on valve block 62 within cavity 64 and has a face slidably engaged by cylinder block 70, cylinder block 70 being urged by the spring 90 into sliding engagement with valve plate 88. Valve plate 88 has a pair of kidney-shaped slots or ports 92,94 (in phantom in FIG. 2) that register with cylinder end openings 96 (FIG. 4) in cylinder block 70 as the latter rotates for sequentially connecting the cylinder block cavities to fluid inlet and outlet ports 98,100 (phantom in FIGS. 2 and 3) in valve block 62. An actuator 102 (FIG. 5) is mounted on valve block 62 within cavity 64 radially outwardly of cylinder block 70 (FIG. 4). Actuator 102 has a piston 104 that engages yoke 84 for pivoting yoke 84 within saddle bearing 86 (FIG. 4). Actuator 102 receives hydraulic fluid through ports 106 (FIGS. 2, 5 and 8) from control valve 44 (FIGS. 1-3 and 8-9) mounted on valve block 62 externally of cavity 64. A yoke-biasing actuator 110 (FIG. 5) is carried by valve block 62 within cavity 64 and has a piston 112 that engages yoke 84 diametrically opposite actuator 102. Actuator 110 is coupled by ports 114 (FIGS. 2-3 and 5) to pump output port 100 A collar 116 encircles piston 112 and is urged against a shoulder on cylinder 112 by a coil spring 118 captured between collar 116 and the opposing face of valve block 62. A bolt 120 is threaded into valve block 62 and is slidably engaged by a slot 122 in the periphery collar 116 for preventing rotation of collar 116 about the axis of piston 112 and actuator 110. Actuator 110 biases yoke 84 to a maximum displacement position illustrated in the drawings, and displacement is reduced as a function of operation of actuator 102.

To the extent thus far described, pump 40 is of generally conventional construction. Position of yoke 84 is controlled by actuator 102 and valve 44 acting against the force of actuator 110 and spring 118. Angle of yoke 84 in turn controls stroke of pistons 74 within cylinder block 70, and thus controls total pump displacement and pump output flow and pressure.

In accordance with the present invention, pump controller 42 takes the form of a microprocessor-based controller (FIGS. 9, 11 and 12A-12E) embodied in a printed circuitboard assembly 130 (FIGS. 2 and 7) mounted externally of valve block 62. A cover 132 is fastened by bolts 134 to valve block 62 to define a sealed cavity containing circuitboard 130 and other electronics to be described. Yoke position sensor 50 (FIGS. 1, 3, 5 and 9), which may comprise an LVDT or a linear potentiometer for example, has a cylindrical body 135 captured within a counterbore 137 in valve block 62 between a snap ring 139 and a spring washer 141. A rod 138 extends from one end of sensor body 135 into cavity 64 and is coupled therewithin to collar 116 on biasing actuator 110. Leads 140 (FIGS. 3, 5 and 7) extend from the opposing end of sensor body 135 through a sealed passage 142 in valve block 62, and emerge beneath cover 132 (FIG. 7) for connection to the pump control electronics. A cover 136 (FIGS. 2 and 5) is removably mounted on the external face of valve block 62 over counterbore 137 to provide access to sensor 50. Sensor 50 thus provides a signal D (FIGS. 9, 11 and 12C) to pump control electronics 42 indicative of position of yoke 84, and thereby indicative of pump displacement. Connectors 133 (FIGS. 2-4 and 7) on cover 132 provide for connection of controller 42 to bus 36 (FIG. 1).

Figure 2:
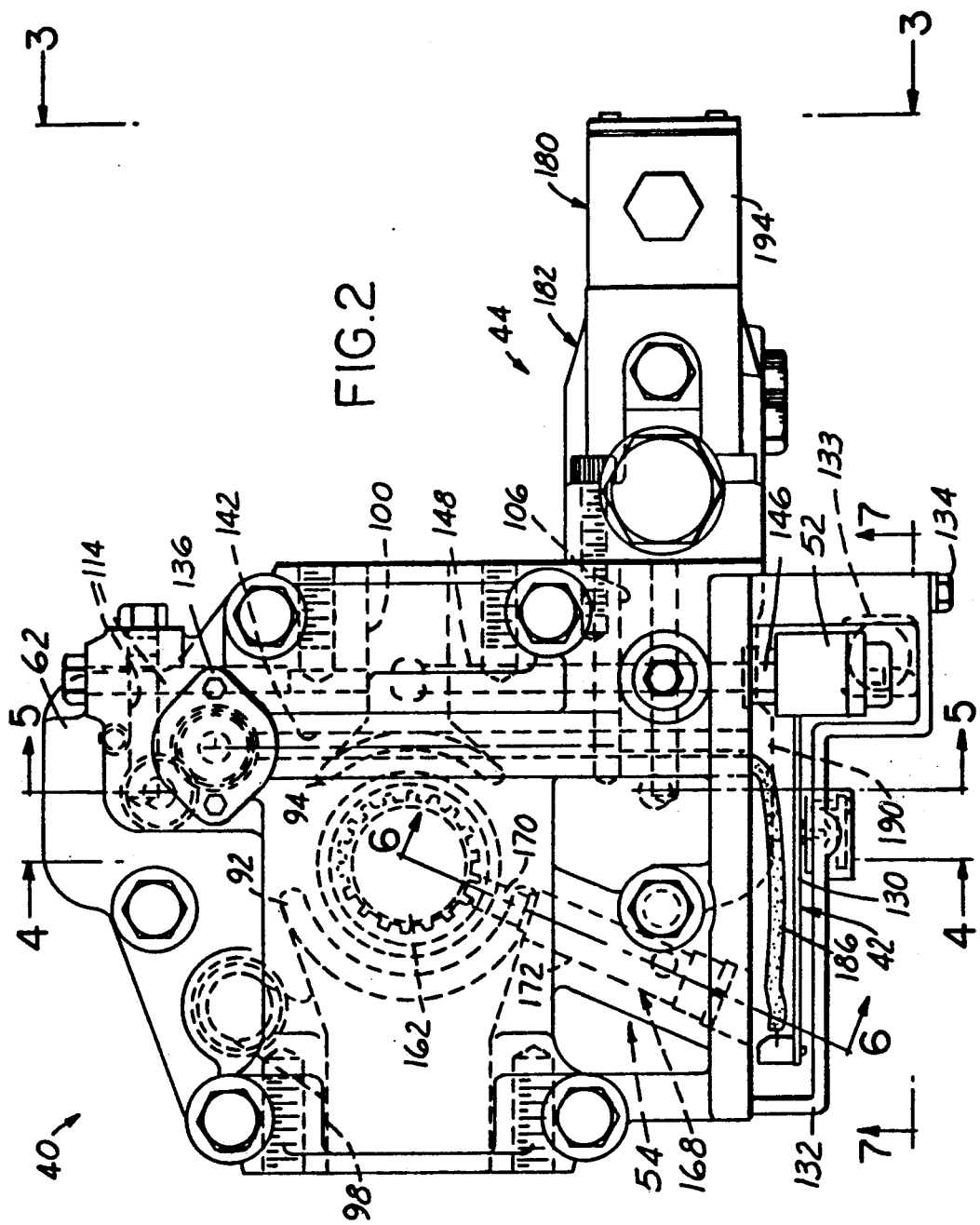
FIG. 2 is an end elevational view of an electrohydraulic variable displacement pump illustrated functionally in FIG. 1.
Figure 3:
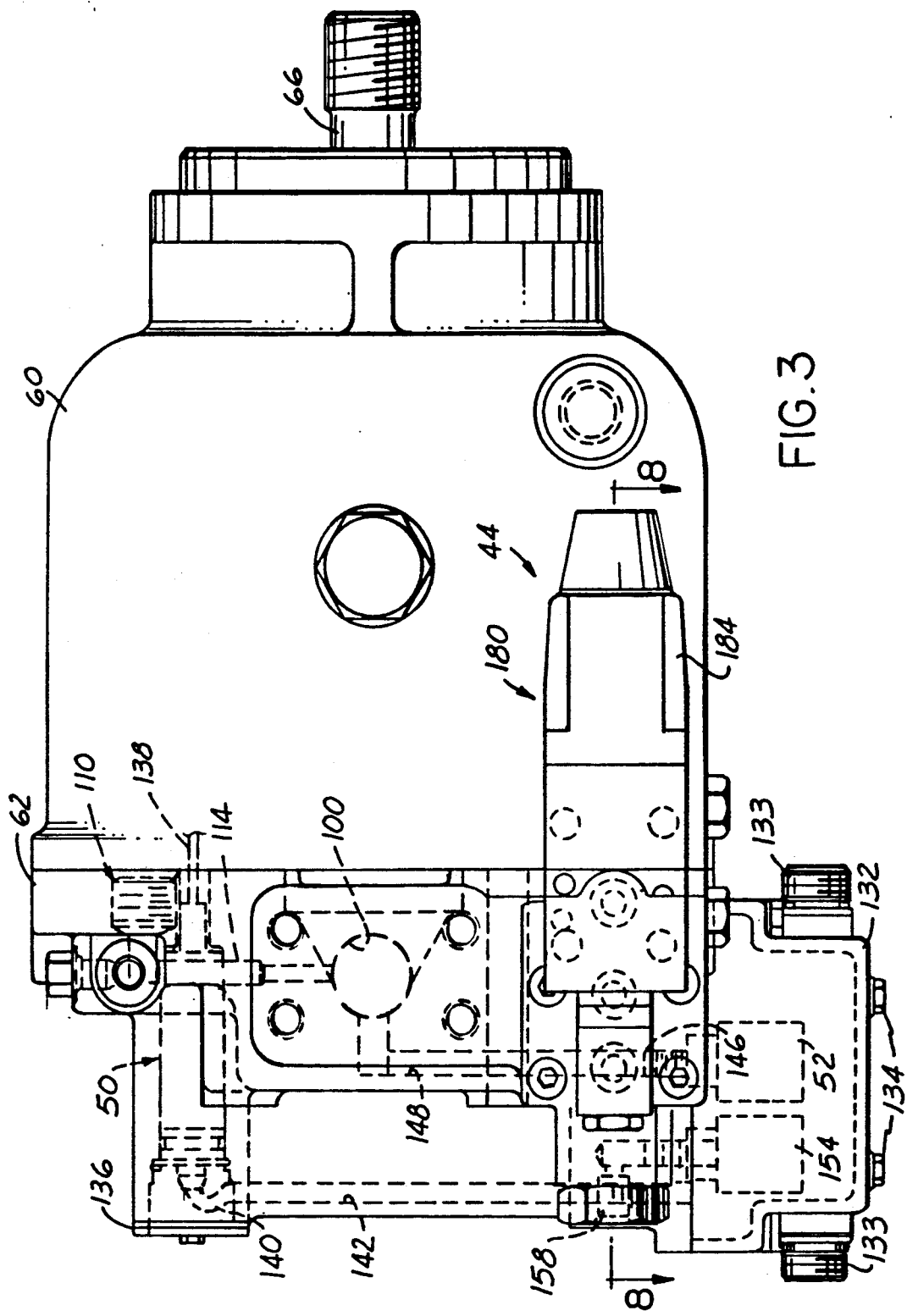
FIG. 3 is a side elevational view of the pump in FIG. 2, being taken substantially from the direction 3—3 in FIG. 2.
Figure 4:
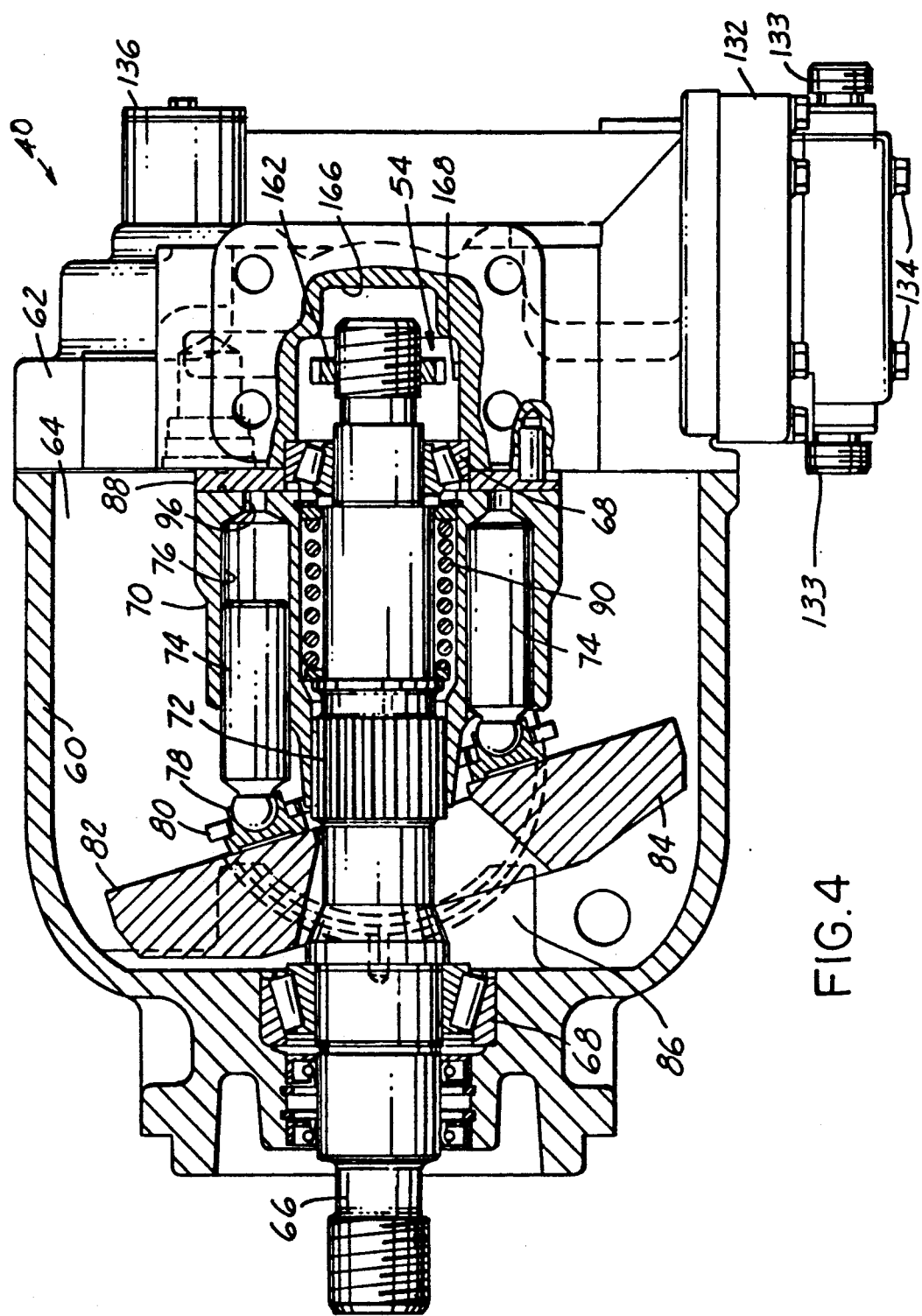
FIGS. 4-7 are fragmentary sectional views taken substantially along the respective lines 4—4, 5—5, 6—6 and 7—7 in FIG. 2.

Pressure sensor 52 (FIGS. 1-3, 7 and 9) is mounted beneath cover 132 and has a sensing tip 146 threaded into valve block 62 to receive hydraulic fluid from output port 100 through the fluid passage 148 (FIGS. 2 and 3). Sensor 52 is connected by leads 152 (FIG. 7) to pump control electronics 42 beneath cover 132 for providing thereto an electrical signal P indicative of pump output fluid pressure. Provision is also made for mounting a second pressure sensor 154 (FIG. 7) beneath cover 132 and connecting corresponding leads 156 to the pump control electronics. A port 158 (FIG. 3) on valve block 62 provides for connection of sensor 154 to external pressure. For example, sensor 154 may be connected to load pressure where it is desired to provide electronic differential pressure control (load sensing) through the pump control electronics.

Pump speed sensor 54 (FIGS. 1, 2, 4, 6 and 9) comprises a toothed wheel or sprocket 162 of ferromagnetic construction press fitted onto the splined end of pump drive shaft 66 for coaxial co-rotation therewith. It will be noted in FIGS. 4 and 6 that sprocket 162 is positioned within a central cavity 166 in valve block 62. A magnetic sensor 168 (FIGS. 2, 4 and 6) comprises a permanent magnet, pole piece and coil assembly 170 that extends outwardly through a passage 171 in valve block 62 from a position radially adjacent to the teeth of sprocket 162. The magnetic sensor is held against a shoulder 173 within valve block passage by a spacer collar 174 (FIG. 6) and a mounting nut 176, the latter being threadably received within a counterbore at the sprocket-remote end of passage 171. Sensor leads 178 (FIGS. 6-7) emerge beneath cover 132 for connection to the control electronics. Sensor 54 thus provides to the control electronics a periodic signal N (FIGS. 9, 11 and 12E) having a frequency indicative of angular velocity of shaft rotation.

Figure 8:
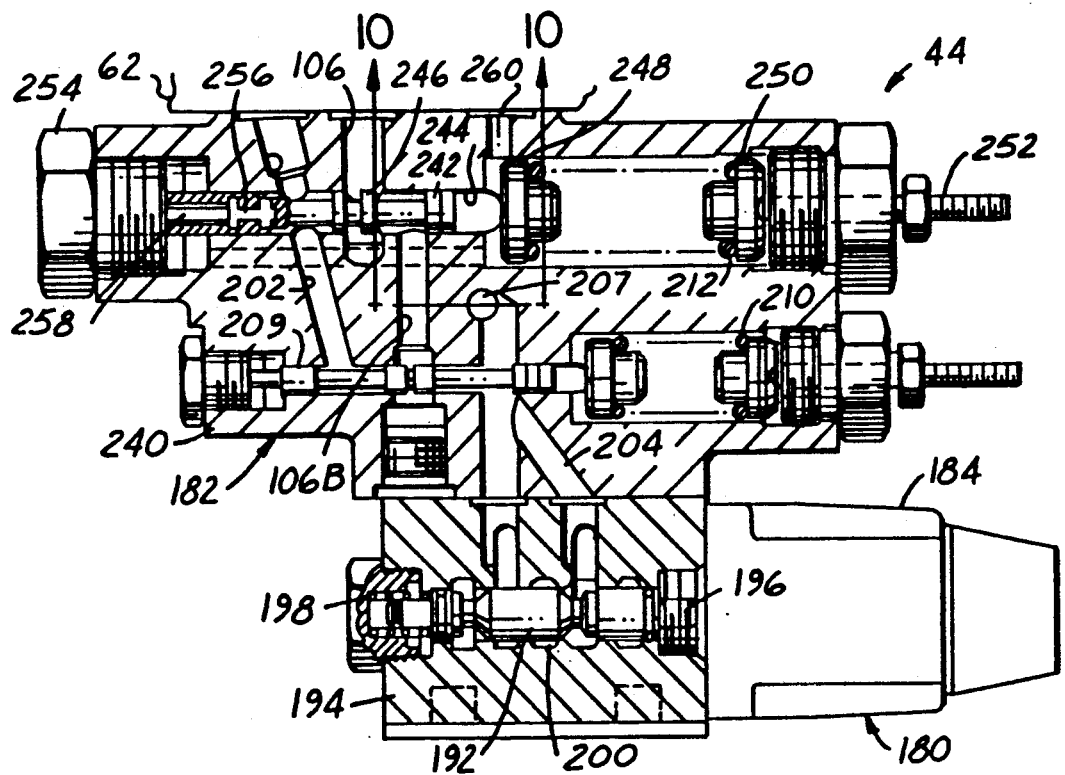
FIG. 8 is a sectional view of the pump control valve, being taken substantially along the line 8—8 in FIG. 3.
Figure 10:
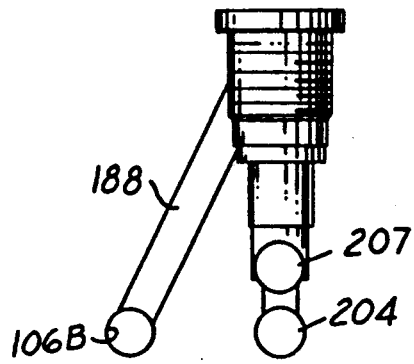
FIG. 10 is a fragmentary sectional view taken substantially along the line 10—10 in FIG. 8.

Control valve 44 is illustrated in greater detail in FIGS. 8 and 10, and includes a solenoid valve 180 mounted on a combined pressure limiter and load sensing valve 182, which in turn is mounted externally of valve block 62 (FIG. 2). Solenoid valve 180 includes a solenoid coil 184 having leads 186 (FIGS. 2 and 7) connected through passages in pressure limiter and load sensing valve 182 (FIG. 8), and through passages 190 in valve block 62 (FIGS. 2 and 7), to emerge beneath cover 132 for connection to control electronics 42. A valve element or spool 192 is slidable within a manifold 194 and is coupled to an armature 196 that extends into solenoid 184 for controlling position of element 192 against the force of an opposing coil spring 198. Valve 180 has a fluid input 200 (FIG. 8) connected to output port 100 (FIG. 2) through passages 202 in pressure limiter/load sensing valve 182 and through passage 148 in valve block 62 (FIG. 2). When the pressure limiter is inactive (FIG. 8), the fluid outlet 204 of valve 180 communicates with yoke actuator 102 (FIG. 5) through a check valve 207 (FIGS. 8 and 10) in pressure limiter/load sensing valve 182, and through passages 106 (FIGS. 2 and 5) in valve block 62. Check valve 207 (FIGS. 8 and 10) allows outlet 204 to bypass the load sensing valve to port 106B when off-stroking the pump. To on-stroke the pump, the fluid must pass through the load sensing spool 209.

Figure 5:
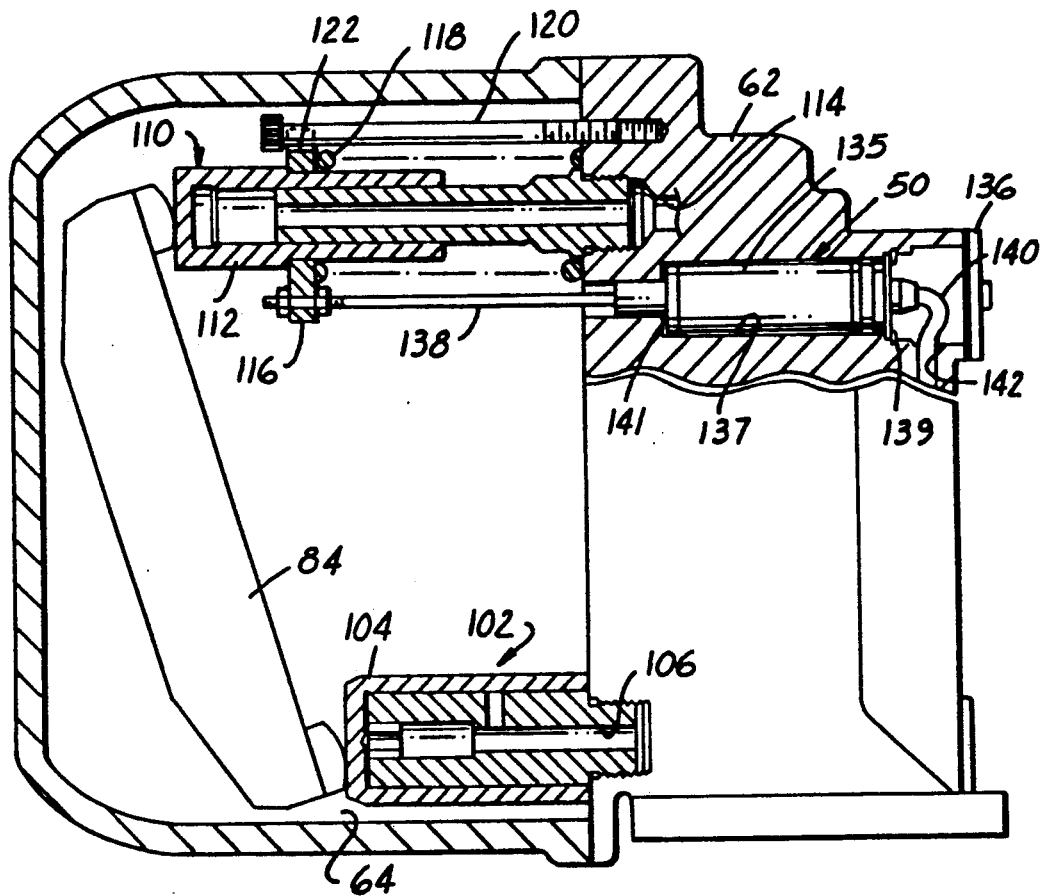
Figure 6:
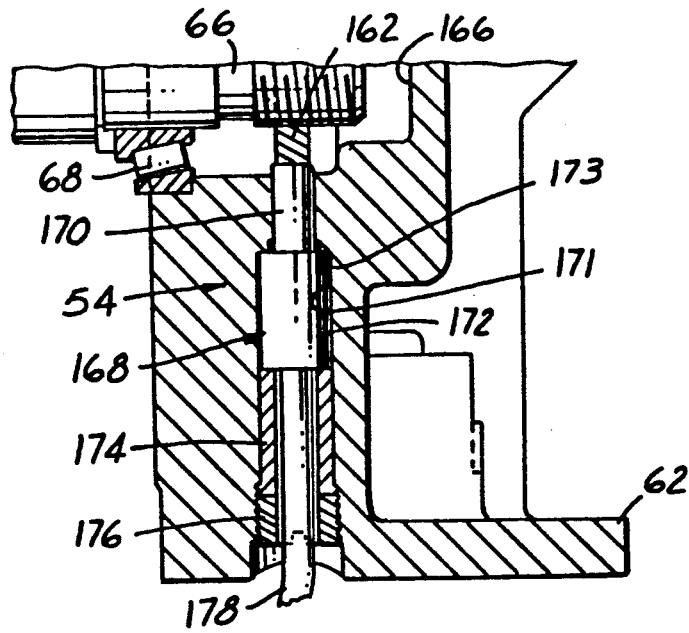
Figure 7:
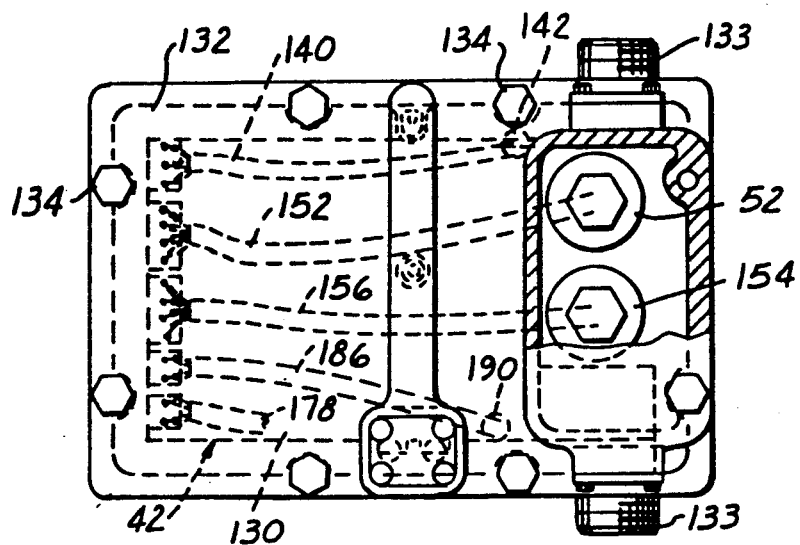

Pressure limiter and load sensing valve 182 has a common manifold 240. A pressure responsive spool 242 is slidable within a bore 244 and has lands 246 for controlling flow of fluid at control pressure through passage 106 to displacement-control actuator 102 (FIG. 5). When the pump output pressure is below the limit value, spool 242 is urged by coil spring 212 to a position against abutment 254. This allows fluid in control actuator 102 to vent to tank port 260 through load sensing spool 209 and electrohydraulic valve spool 192 in valve bodies 182 and 194. Coil spring 212 is adjustably captured between seat 248 that engages the inward end of spool 242 and a second seat 250 that is engaged by pressure limit adjustment screw 252. A piston 258 is slidable in the opposing end of spool 242 and engages abutment 254. Pump output pressure in manifold passage 202 is communicated to the inner end of piston 258 through spool passage 256. The pressure urges spool 242 to move in opposition to the force exerted by spring 212 when the pressure force exceeds the adjusted value of the spring force. This allows fluid to flow across land 246 to the displacement-control actuator 102. Since the area responsive to pump output pressure is that of the small piston 258 rather than that of spool 242, a smaller spring 212 than is conventional in the art can be used, thereby reducing the overall size of the pressure limiter and load sensing valve 182. Tank port 260 in manifold 240 communicates through passages (not shown) with internal pump case cavity 64 (FIG. 4), and opens into the cavity surrounding spring 212, seats 248, 250 and the cavity surrounding the spring-remote end of spool 242.

The optimal hydromechanical load sensing valve 209 functions in a conventional manner. Pump discharge pressure acts on the left end of spool 209 and load orifice down stream pressure is ported to the spring cavity at the right end of the load sensing spool 209. This spool maintains a constant differential pressure across the load orifice in spite of varying load pressure. This arrangement of spools provides the necessary functional priorities while minimizing the need for special hardware. The load sensing function can be implemented hydromechanically or through the electronic control previously described.

Figure 9:
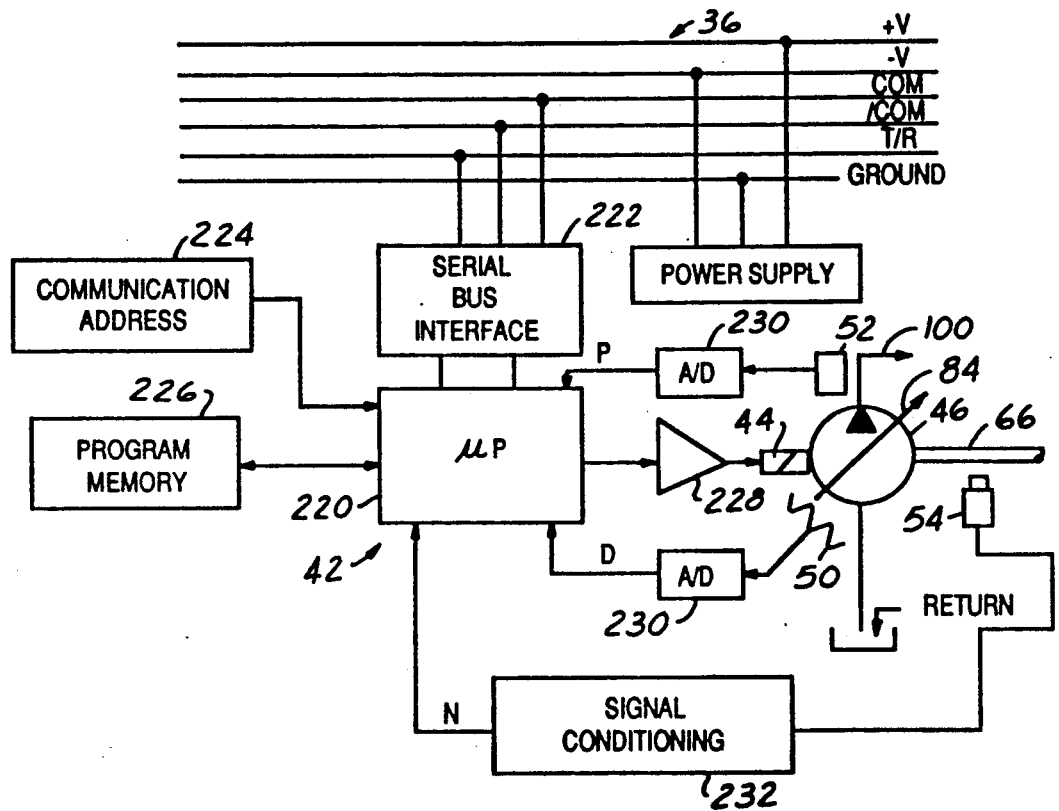
FIG. 9 is a general functional block diagram of the pump system.

Pump system 40 is illustrated functionally in FIG. 9 as comprising a microprocessor 220 having input and output ports respectively connected through a serial interface 222 to the COM, /COM and T/R conductors of bus 36. The COM and /COM lines comprise conventional differential transmission lines, and the T/R line indicates transmission or reception mode. Pump control microprocessor 220 receives a communication address input from an address selection module 224, which may comprise DIP switches or the like for selectively setting pump controller address, or electronic memory for receiving and storing an address command from master controller 34 (FIG. 1) on initial start-up. Microprocessor 220 is also connected to a memory 226 having stored therein the various pump control programs or algorithms. Exemplary pump control algorithms are disclosed in U.S. application Ser. No. 164,958, now U.S. Pat. No. 4,811,561, referenced above, and in U.S. Pat. No. 4,741,159 also assigned to the assignee hereof, both of which applications are incorporated herein by reference for background. A power amplifier 228 feeds pulse width modulated control signals from microprocessor 220 to control solenoid 184 (FIG. 8) of valve 180 for controlling yoke position, and thereby controlling output of pump 46. Sensor 50 is responsive to yoke position as previously described, and is connected through an A/D converter 230 for providing signal D to microprocessor 220 indicative of yoke position. Likewise, sensor 54 is operatively coupled to pump drive shaft 66 as previously described to provide a signal N through signal conditioning circuitry 232 indicative of pump shaft speed. Pressure sensor 52 provides pressure signal P to microprocessor 220 through A/D converter 230.

Figure 11:
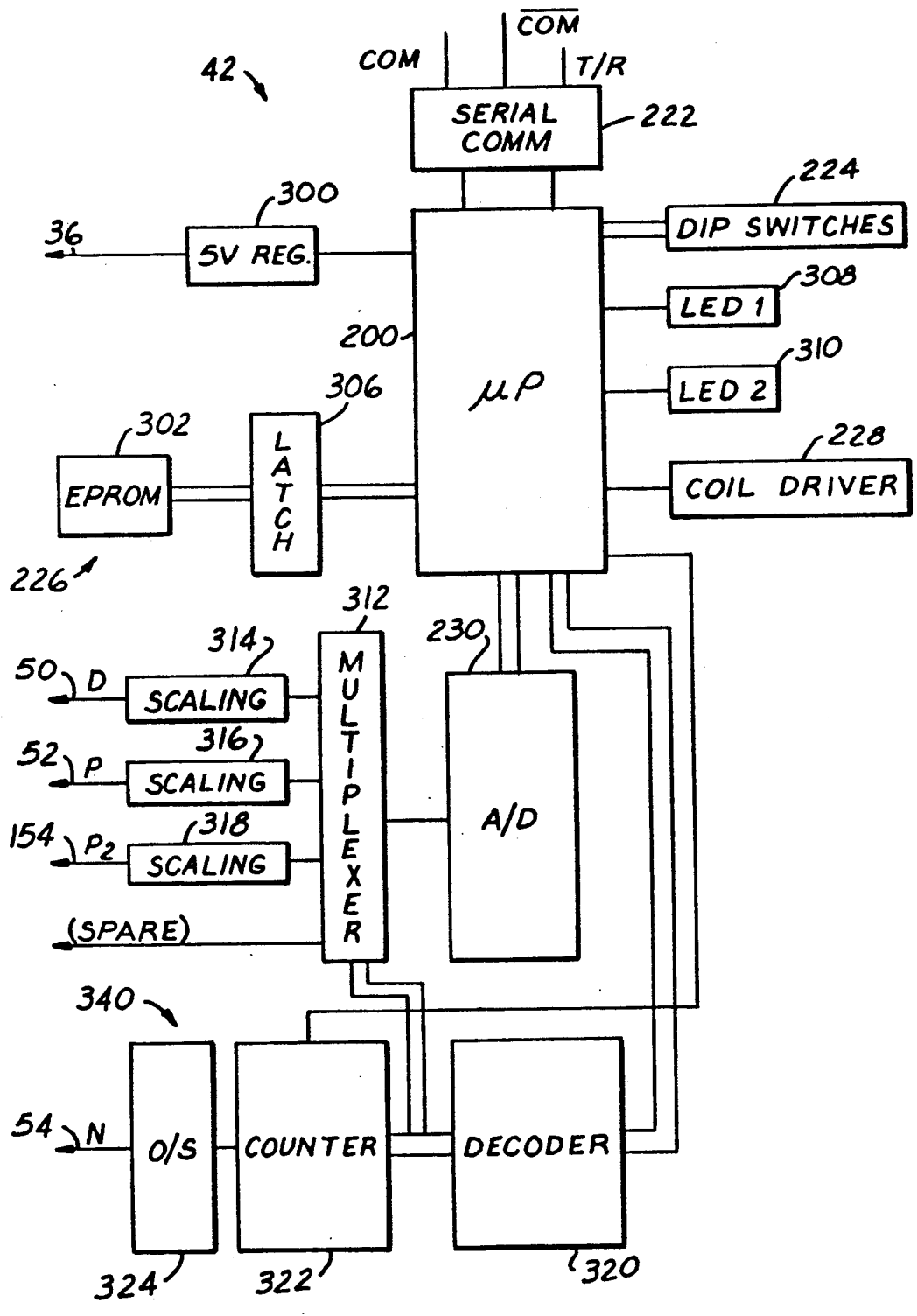
FIG. 11 is a more detailed functional block diagram of the pump system control electronics.

FIG. 11 is a more detailed functional block diagram of the control electronics in the system illustrated generally in FIG. 9. Microprocessor 220 and the remainder of the control circuitry receive power from bus 36 through a five volt regulator 300. Memory 226, including an EPROM 302, is connected to microprocessor 220 through an associated address decoder and latch 306. LEDs 308, 310 are connected to the microprocessor for indicating pendency of communication through serial communications interface 222 and signal bus 36 (FIGS. 1 and 9). The signal outputs of displacement sensor 50 and pressure sensors 52, 54 are connected to the signal inputs of a multiplexer 312 through associated scaling circuits 314, 316, 318 respectively. Multiplexer 312 also has a spare signal input line. The signal output of multiplexer 312 is connected through a/d converter 230 to data inputs of microprocessor 220. An address decoder 320 receives an output from microprocessor 220, and is connected both to the selection control inputs of multiplexer 312 and to the data input of a counter 322. Counter 322 receives an enabling input from microprocessor 220 and a clock input from speed sensor 54 through a one-shot 324.

Figure 12A:
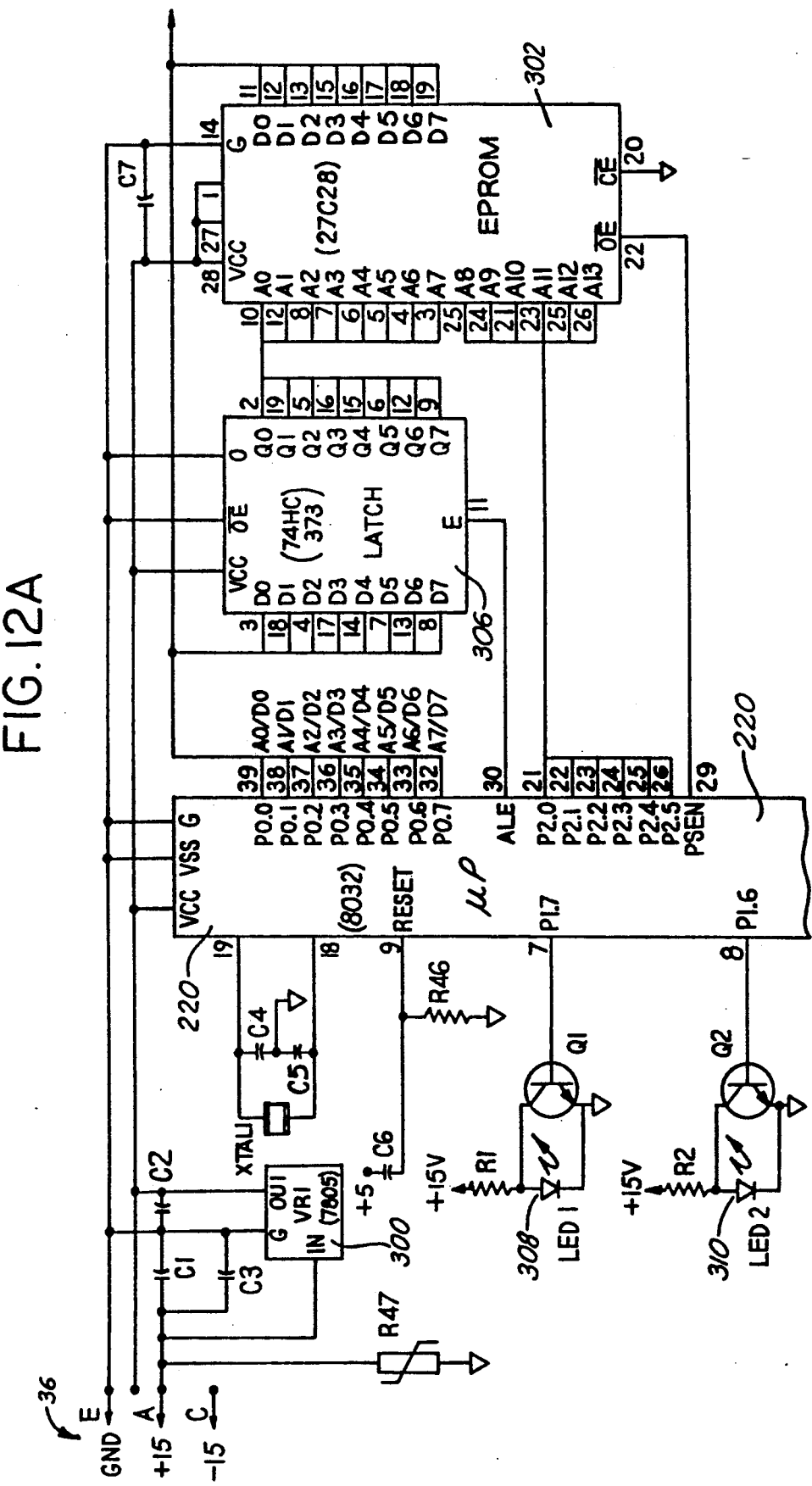
Figure 12B:
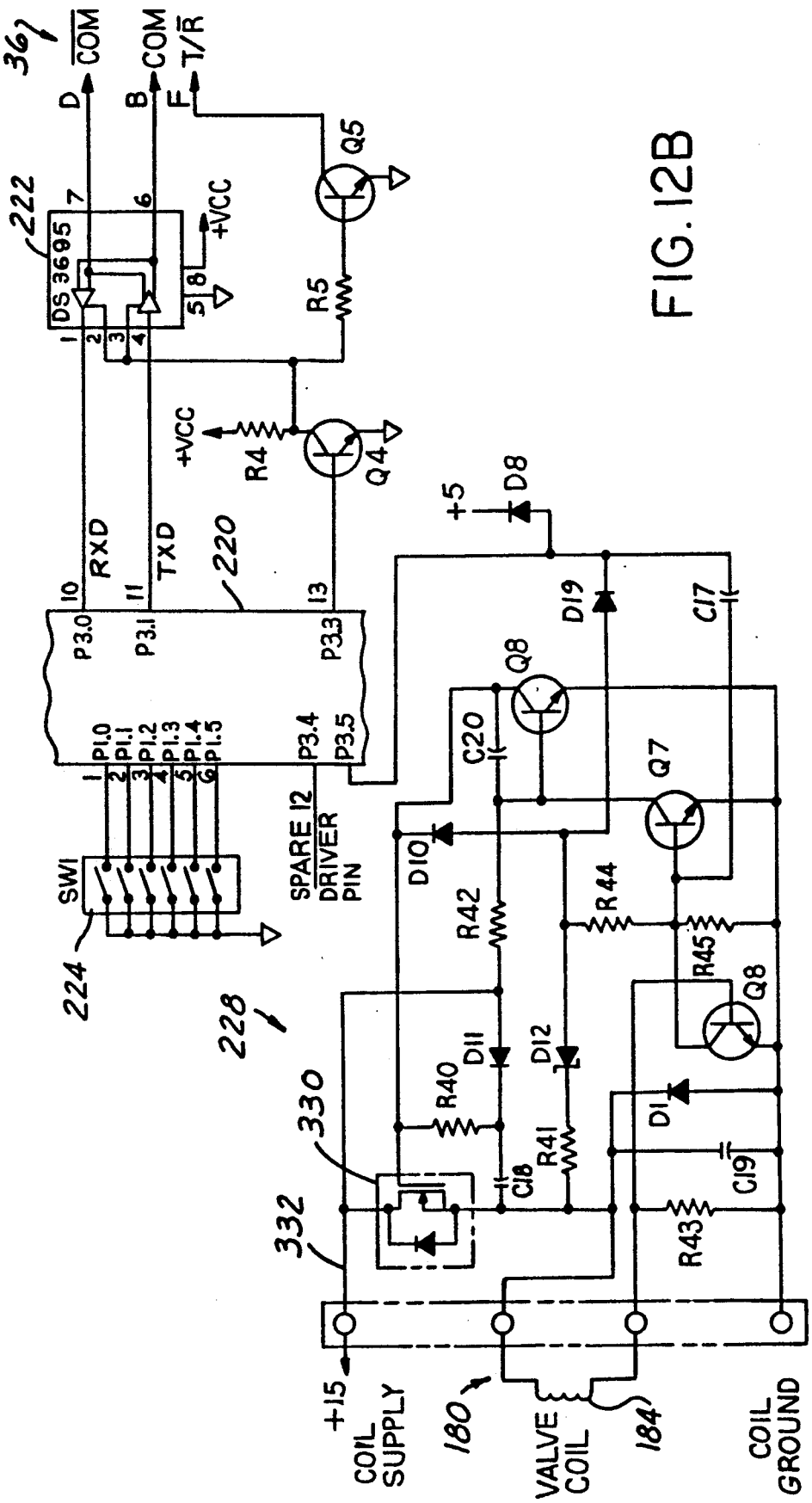
Figure 12C:
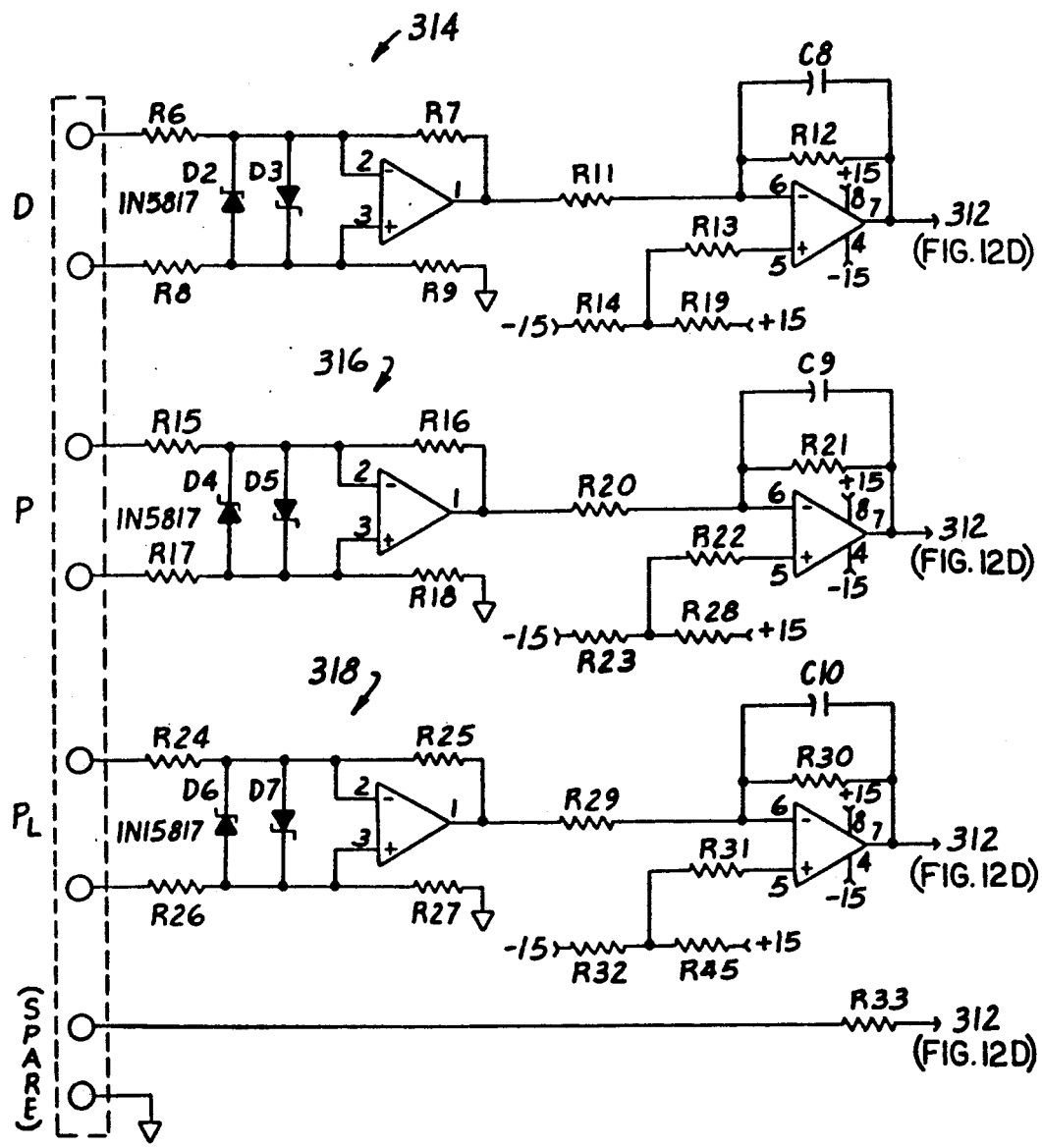
Figure 12D:
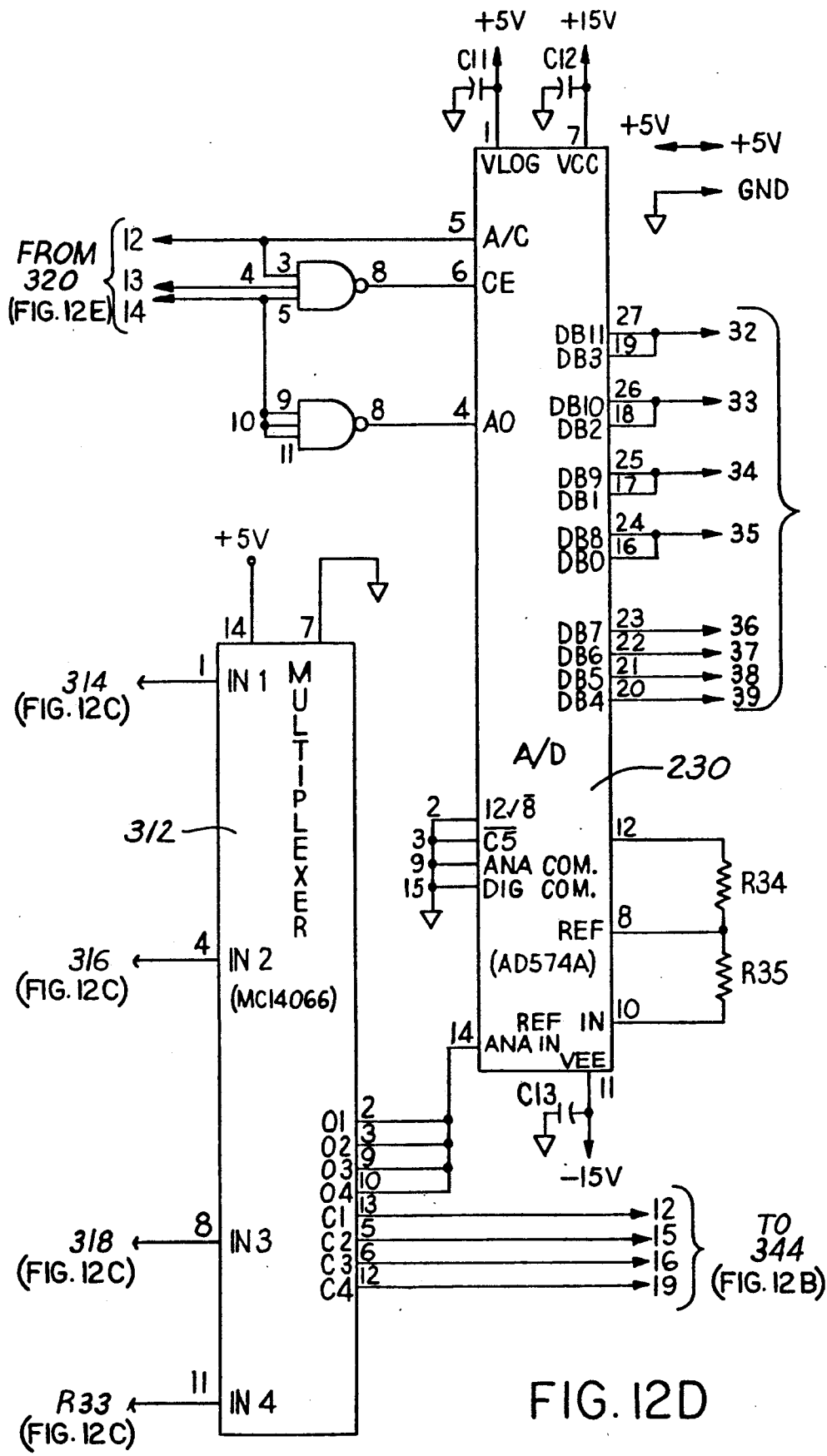

FIGS. 12A-12E together comprise an electrical schematic diagram of control electronics 42. A major portion of electronics 42 is similar to the valve control electronics disclosed in U.S. Pat. No. 4,757,747 referenced hereinabove. Valve driver 228 in accordance with one aspect of the present invention is illustrated in detail in FIG. 12B, and the electronics for measuring pump speed in accordance with another aspect of the invention is illustrated in FIG. 12E.

Valve driver 228 (FIG. 12B) includes an N-FET 330 having primary current-conducting source and drain electrodes connected in series with coil 184 of valve 180 and a current sensing resistor R43 between a voltage supply bus 332 and ground. The gate of N-FET 330 is connected to a transistor switch Q7, Q8 that receives a switch control input from microprocessor 220 through a series capacitor C17. The high side of coil 184 at the drain of N-FET 330 is also connected to the input of switch Q7, Q8 at the base of transistor Q7 through the series combination of resistors R41, R44 and a zener diode D12. Current sensing resistor R43 is connected across the base of a transistor Q8 that has a collector connected to the base of transistor Q7. The base of transistor Q7, forming the input of transistor switch Q7, Q8, is also connected through resistor R44 and a diode D19 to the switch control input from microprocessor 220.

In operation, the switch control input to valve driver 228 from microprocessor 220 preferably comprises a pulse width modulated signal having a constant frequency, and having a duty cycle that varies in proportion to desired flow at valve 180. Positive transition of the switch control input signal drives the base of Q7 high for a time determined by capacitor C17 and resistor R45, which thus form a one-shot having an output pulse duration on the order of sixty microseconds, for example. This pulse turns on transistor Q7, turns off transistor Q8, and thus drives the gate of N-FET 330 through resistor R40 and diode D11, causing the N-FET to saturate and pass current to coil 184 and resistor R43. The voltage drop across coil 184 and resistor R43 is sufficient to maintain the high signal level at the base of transistor Q7 through the feedback path R41, D12, R44 and resistor R45 across the base of transistor Q7. The combination of the input one-shot capacitor C17 and feedback components R41, R44, D12 thus form a latch for maintaining transistor switch Q7, Q8 in the set condition in which N-FET 330 passes current to valve coil 184. Resistor R40 and capacitor C18 are selected to establish a low-frequency cutoff for valve driver 228, such as at 100 Hz for example. When the pulse width modulated switch control signal from microprocessor 220 goes low, current drawn through diode D19 and capacitor C17 shuts off transistor Q7, and thereby cuts off current to coil 184 through N-FET 330.

If the high side of valve coil 184 is shorted to the low side or to ground at the time of the positive switch control input signal transition, the voltage drop across the coil will be insufficient to maintain transistor Q7 in the on condition through resistors R41, R44 and diode D12, so that switch Q7, Q8 will reset immediately upon termination of the C17 one-shot pulse. This short pulse is insufficient to cause destruction of N-FET 330. If N-FET 330 is turned on when the short circuit occurs, switch Q7, Q8 will turn off N-FET 330 to prevent damage. If an overload is imposed on N-FET 330 and too much current is drawn in other than a condition that short circuits coil 184, voltage drop across resistor R43 will be above the threshold at the base of transistor Q8. Transistor Q8 will thus turn on and short circuit the base of transistor Q7, resetting transistor switch Q7, Q8 and turning off N-FET 330. Coil drive circuit 228 thus employs an N-FET 330 that has approximately one-half of the series resistance than do P-FETs conventionally employed in such applications, thereby minimizing heat dissipation. Further, the described circuitry for sensing conditions at valve coil 184 and terminating valve current protects N-FET 330 against excessive heat and damage.

Referring to FIG. 12E, counter 322 of speed sensing circuit 340 (FIGS. 11 and 12E) includes an up/down counter 342 that has a clock input connected to coil 172 of sensor 54 (FIGS. 2 and 6) through one-shot 324. The data inputs of counter 342 are connected to the data outputs of a latch 344, which in turn has inputs connected to microprocessor 220 (FIGS. 11 and 12A). The control inputs of latch 344 and counter 342 are connected to address decoder 320, which in turn is controlled by associated outputs of microprocessor 220.

In operation, speed sensing circuitry 340 provides an output to the P3.2 (FIG. 12E) input of microprocessor 220 that indicates total time interval over a preselected number of speed signal cycles from coil 172. That is, microprocessor 220 determines the number of tooth intervals over which the speed measurement cycle is to be measured, and this number (incremented by one) is placed on the associated microprocessor output port and stored in latch 344 through enablement of address decoder 320. For example, if the speed measurement is to be performed over eight inter-tooth intervals, the number "9" (corresponding to the total number of teeth involved in eight tooth intervals) is loaded into latch 344.

To begin a speed measurement cycle, microprocessor 220 then enables counter operation through decoder 320, first to load the preselected count from latch 344 into counter 342, and then to down-count the counter as a function of the clock signals received from one-shot 324 upon occurrence of each sprocket tooth. The first tooth passing sensor 54 after enabling counter 342 causes the P3.2 input of microprocessor 220 to go high. When the final tooth passes sensor coil 172, microprocessor input P3.2 goes low. Microprocessor 220 is programmed such that its internal timer increments each microsecond that the P3.2 input is high. Since turning the timer on and off is not controlled by software, other interrupts have no effect upon timer accuracy. Thus, the number of teeth or pulses over which shaft speed is to be measured is easily and selectively adjustable at the microprocessor. The accuracy of the measurement itself corresponds to the period of the microprocessor clock (FIG. 12A), typically one microsecond. The timer interrupt used for measuring time between the teeth does not have to be serviced immediately, and may also be relatively simple. The speed sensing interrupt does not affect the performance of the other interrupts, such as the pulse width modulation and serial communication interrupts, and the other interrupts do not affect the speed sensing interrupt.

Figure 13A:
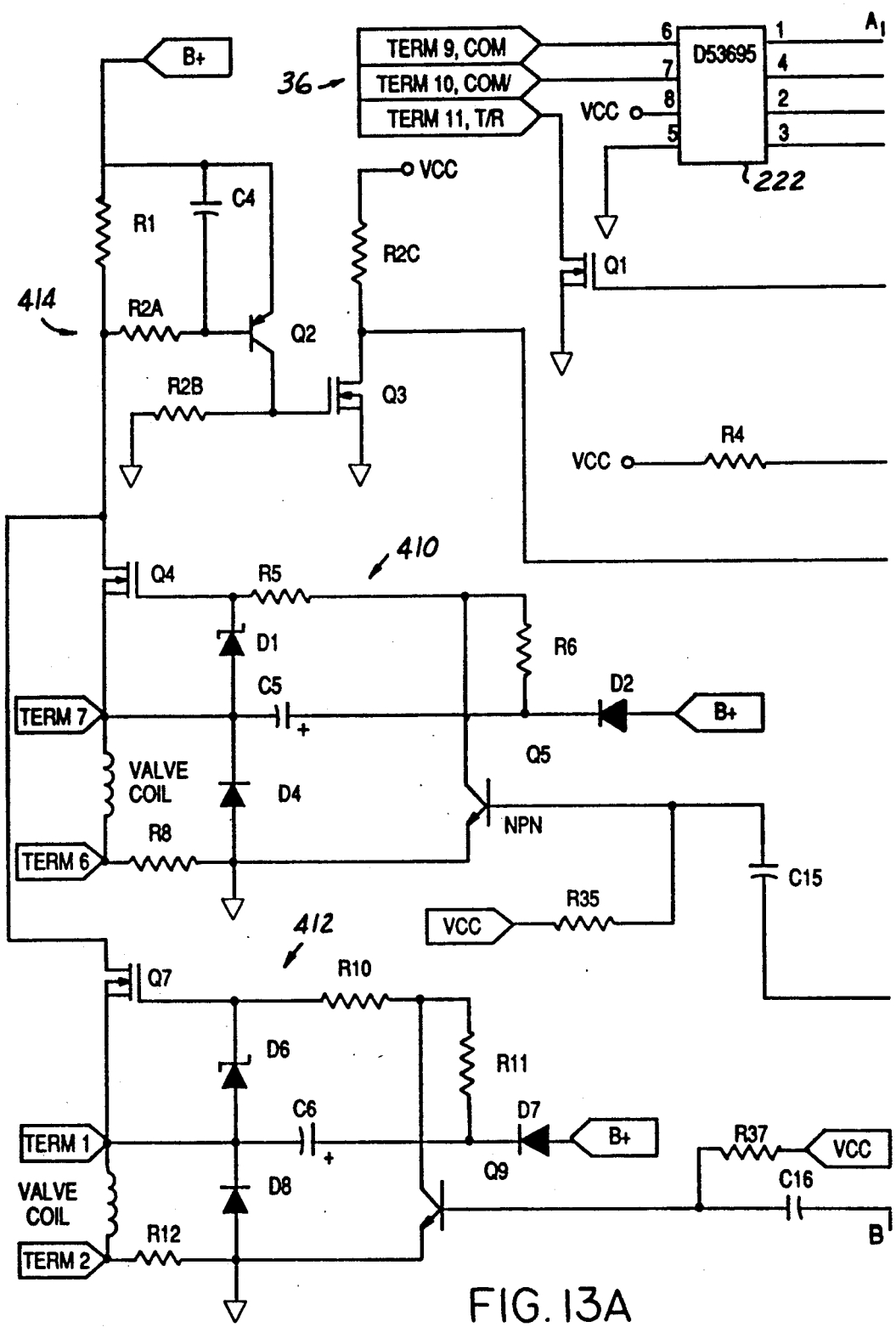
FIGS. 13A-13E together comprise a detailed electrical schematic diagram of the pump control electronics in a presently preferred embodiment of the invention.
Figure 13B:
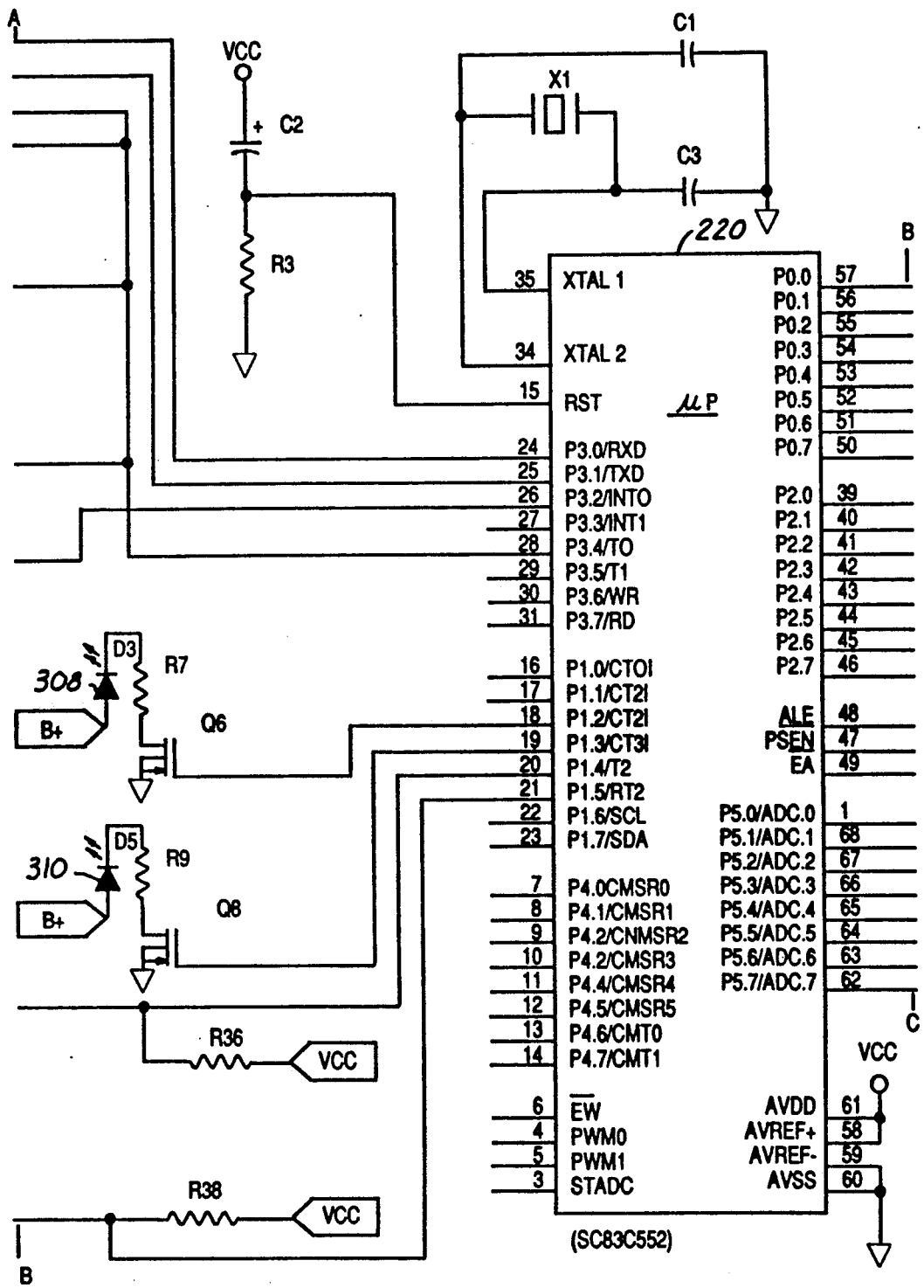
Figure 13C:
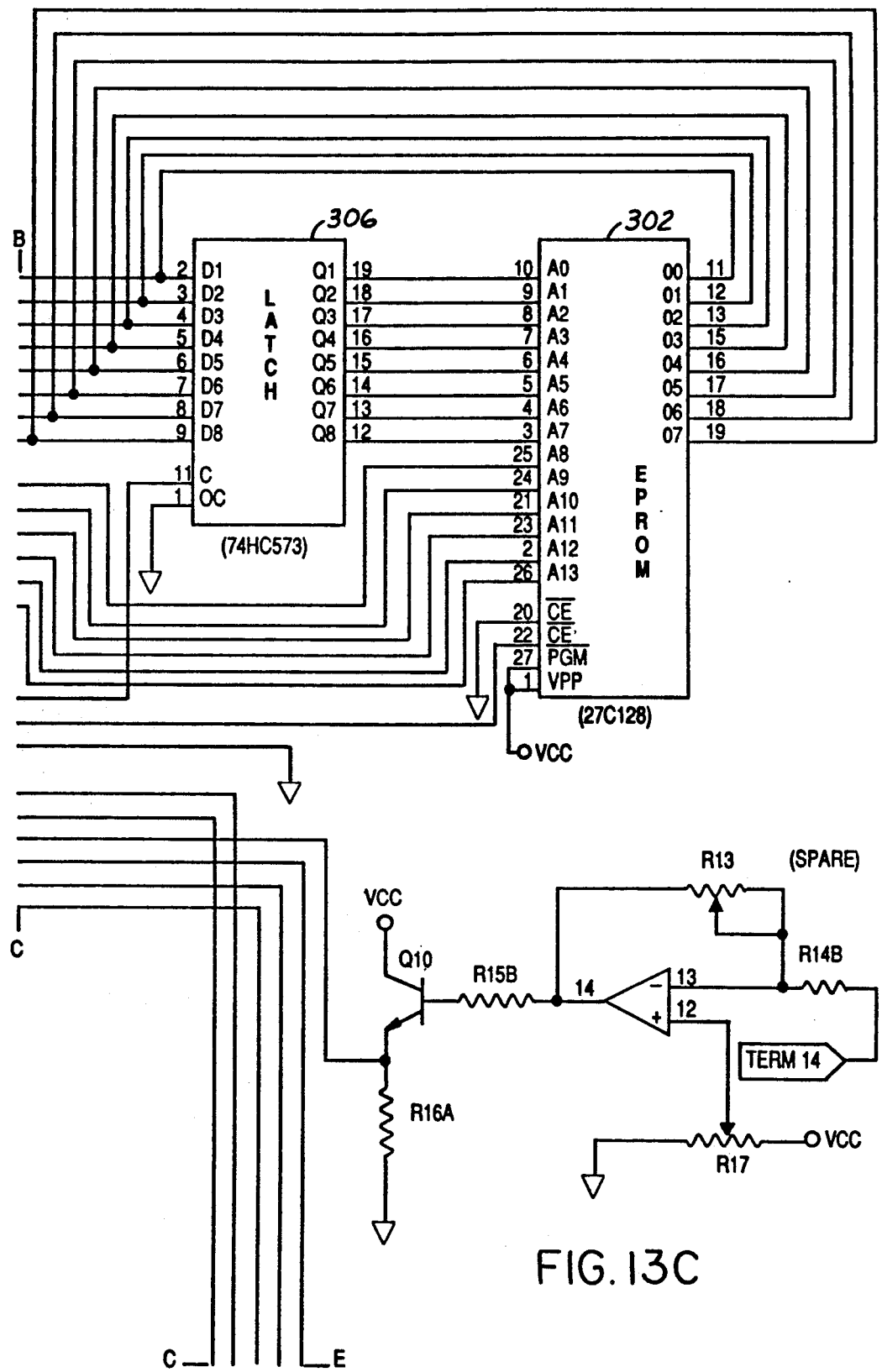
Figure 13D:
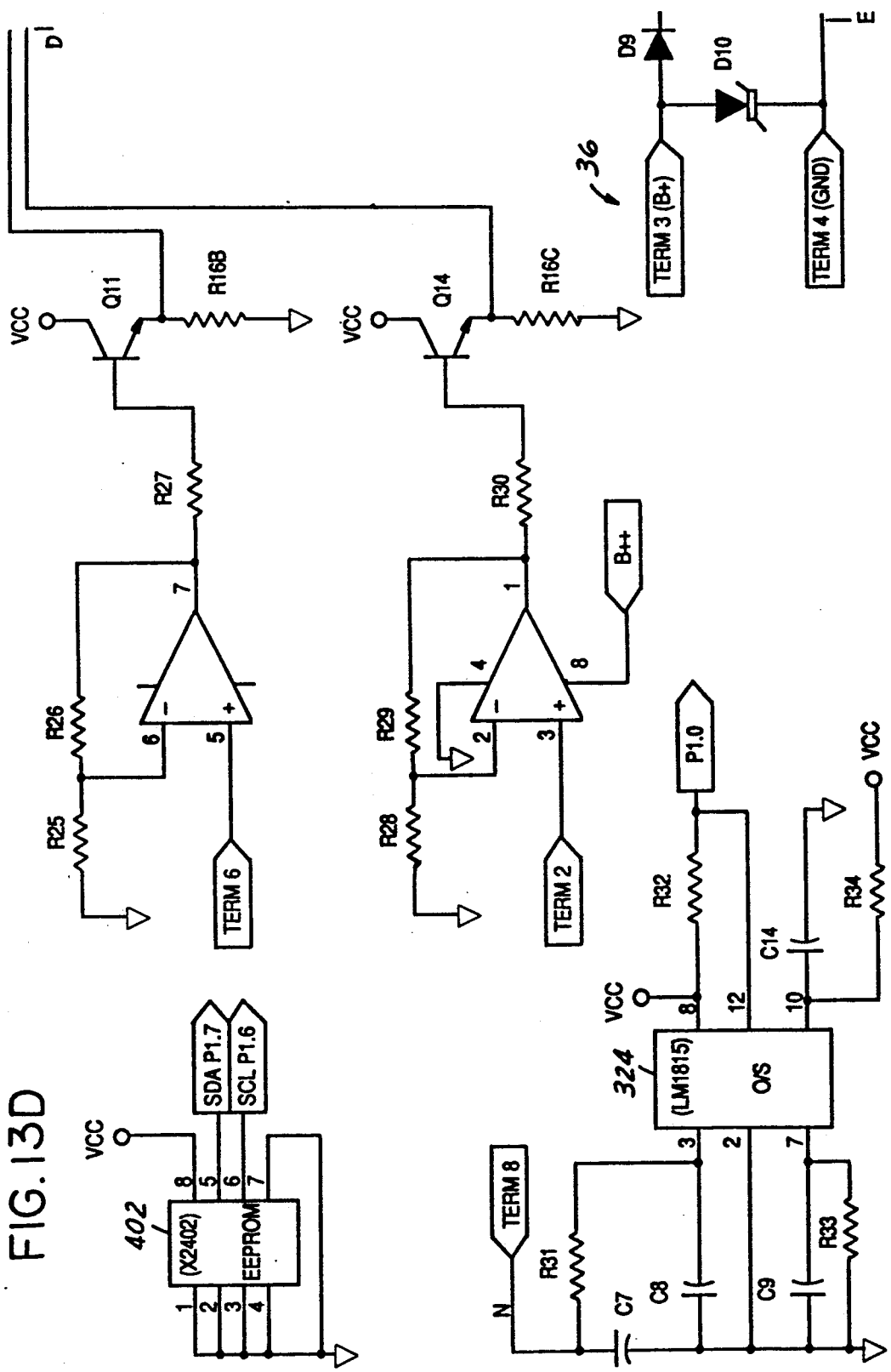
Figure 13E:
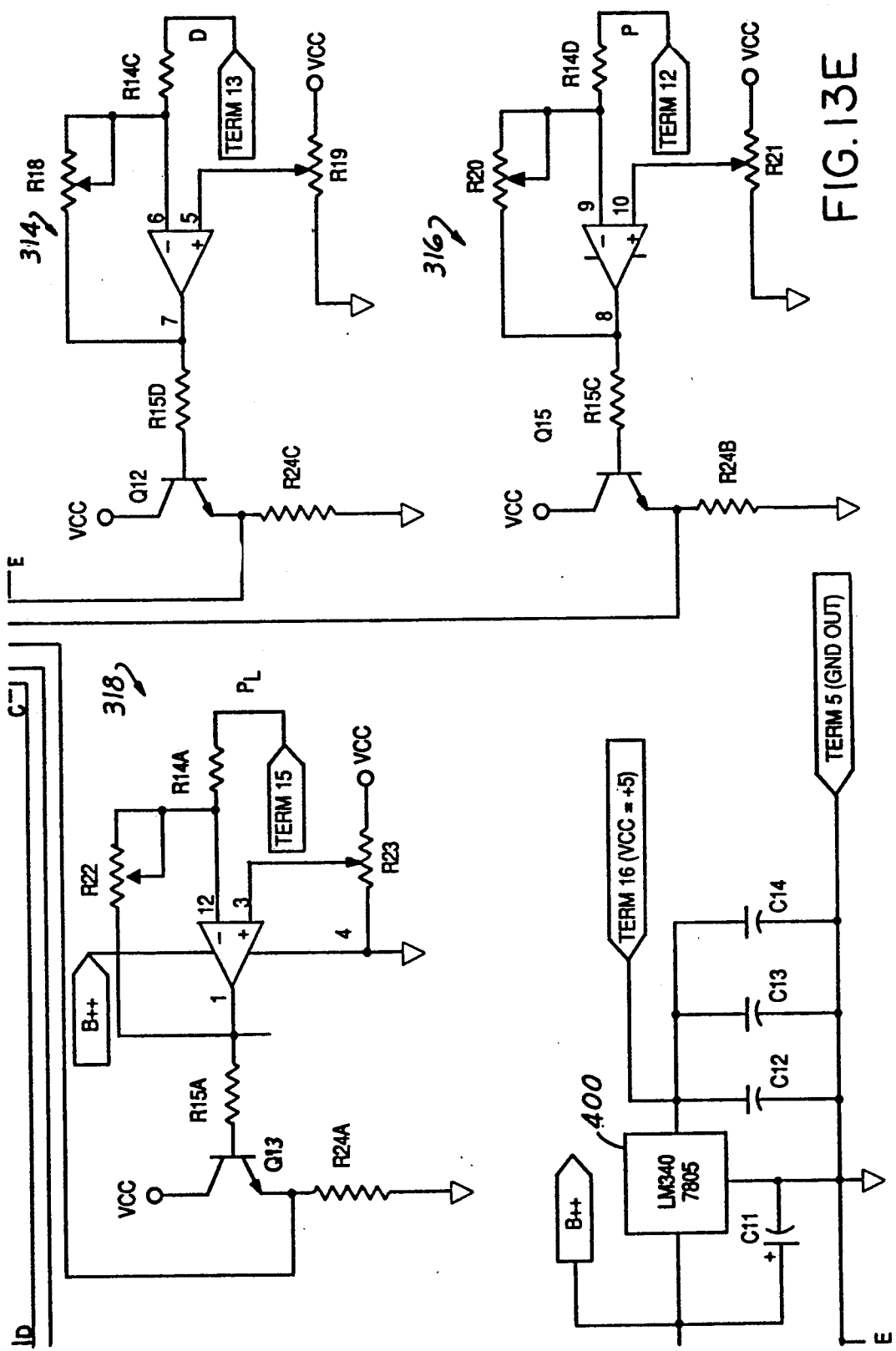

FIGS. 13A-13E together comprise an electrical schematic diagram of a modified pump controller, FIGS. 13A and 13B being interconnected along the lines A-B in each figure, FIGS. 13B and 13C being interconnected along the lines B-C in each figure, FIGS. 13C and 13E being interconnected along the lines C-E in each figure, and FIGS. 13D and 13E being interconnected along the lines D-E in each figure. Elements corresponding to those hereinabove discussed in detail in conjunction with FIGS. 11 and 12A-E are identified by correspondingly identical reference numerals. Only differences between the controllers will be discussed in detail.

Microprocessor 220 in the controller of FIGS. 13A-13B is sufficiently fast and powerful that multiplexer 312 (FIG. 12D) is eliminated, and the signal conditioning circuits 314-318 (FIG. 13E) are connected directly to corresponding ports (FIG. 13B) of the microprocessor. Likewise, one-shot 324 (FIG. 13D) is connected directly to a corresponding port (FIG. 13B) of the microprocessor, and the separate speed computation electronics of FIG. 12E is eliminated. A diode D9 (FIG. 13D) and a capacitor C11 (FIG. 13E) are connected to the power input of voltage regulator 400 for maintaining power at the controller board for up to two milliseconds after loss of supply voltage, which allows the microprocessor ample time to turn off the output drivers (FIG. 13A) to the valve coils. An EEPROM 402 (FIG. 13D) is connected to microprocessor 220 (FIG. 13B) and stores erasable programming, including the address associated with the pump controller, thereby eliminating the address switches 224 (FIGS. 11 and 12B).

Two coil drivers 410, 412 (FIG. 13A) are provided for pulse width modulating a pair of coils on a proportional solenoid flow control valve or the like. Since the power MOSFET in each driver is between the coil and the supply voltage, as in driver 228 (FIG. 12B), the associated coil cannot be energized unless the MOSFET is turned on. (Circuits using low side drivers can inadvertently be turned on if one side of the coil is shorted to ground.) Likewise, as hereinabove discussed in conjunction with driver 228, the N-channel MOSFETs Q4 and Q7 exhibit a lower "on" resistance than do P-channel MOSFETs, thus minimizing the heat dissipated by the drivers. However, the gate voltage for an N-channel MOSFET must exceed the supply voltage to turn the MOSFET on. In drivers 410, when transistor Q5 is turned on by the microprocessor, the gate voltage at MOSFET Q4 drops to ground and the voltage at TERM7 also drops to ground. Supply voltage is connected across capacitors C5, and the capacitor charges to supply potential. When transistor Q5 is turned off by the microprocessor, the voltage at the gate of MOSFET Q4 turns the MOSFET on. As the voltage at TERM7 increases, the gate voltage of MOSFET Q4 increases proportionally due to capacitor C5. This voltage is limited by zener diode D1 to protect MOSFET Q4. Driver 412 operates in the same manner. If the pulsed output from the microprocessor should stop for any reason, pull-up resistors R35 and R37 will turn off associated transistors Q5 and Q9, and thereby turn off the MOSFET drivers Q4 and Q7.

A current overload sensor 414 senses excessive current being drawn by one or both of the valve coils, which could damage drivers Q4 and Q7 or cause the supply voltage to drop sufficiently for the microprocessor to malfunction. The sum of the currents through drivers Q4 and Q7 passes through the sensing resistor R1 connected between the supply voltage and the coils. As coil current increases, the voltage drop across resistor R1 correspondingly increases up to a level that turns on threshold detector Q2. When detector Q2 turns on MOSFET Q3, an interrupt is generated to microprocessor 220 (FIG. 13B). The microprocessor then turns off the coil drivers and advises the operator of a problem.

We claim:

1. An electrohydraulic valve control system that comprises a valve including a manifold having openings for connection to a source of hydraulic fluid and to a load, a valve element variably positionable in said manifold for controlling flow of fluid among said openings, a stator including electronic coil means mounted on said manifold for receiving valve control signals, an armature coupled to said valve element and responsive to said stator coil means for variably positioning said valve element within said manifold, and valve drive means for supplying said valve control signals to said stator coil means; characterized in that said valve drive means comprises:

a solid state switch having power electrodes for selectively applying electrical power to said stator coil means and having a control electrode, means for supplying a switch control signal, switch circuit means responsive to said switch control signal and coupled to said control electrode for setting said switch circuit means and applying power to said coil means responsive to said switch control signal, and means responsive to current through said coil means for resetting said switch circuit means and terminating application of electrical power to said coil means independently of said switch control signal.

2. The system set forth in claim 1 wherein said solid state switch comprises an N-FET.

3. The system set forth in claim 2 wherein said N-FET is connected between a voltage supply and one terminal of said coil means, said coil means having a second terminal connected to electrical ground.

4. The system set forth in claim 1 wherein said switch circuit means includes a one-shot responsive to transitions of one polarity at said switch control signal for setting said switch circuit means, and means responsive to transitions at said switch control signal of opposing polarity for resetting said switch circuit means.

5. The system set forth in claim 1 wherein said current-responsive means comprises means responsive to voltage drop across said coil means for holding said switch circuit means set.

6. The system set forth in claim 5 wherein said current-responsive means further comprises means responsive to excess current through said coil means for resetting said switch circuit means independently of said voltage-drop-responsive means and said switch control signal.

* * * * *